(12) United States Patent  
Hayakawa

(10) Patent No.: US 8,823,997 B2  
(45) Date of Patent: Sep. 2, 2014

(54) PROCESSING OF LOGICAL PAGE DATA FOR A PRINTER

(75) Inventor: Michio Hayakawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 262 days.

(21) Appl. No.: 13/214,789

(22) Filed: Aug. 22, 2011

(65) Prior Publication Data

US 2012/0243033 A1    Sep. 27, 2012

(30) Foreign Application Priority Data

Mar. 24, 2011 (JP) .................................. 2011-065744

(51) Int. Cl.  
*G06K 15/00* (2006.01)  
*G06F 3/12* (2006.01)  
*G06K 15/02* (2006.01)

(52) U.S. Cl.  
CPC .......... *G06K 15/1822* (2013.01); *G06F 3/1244* (2013.01); *G06F 3/1215* (2013.01); *G06F 3/124* (2013.01); *G06F 3/1279* (2013.01); *G06F 3/1213* (2013.01); *G06K 15/1851* (2013.01); *G06F 3/125* (2013.01)  
USPC .......................... 358/1.18; 358/1.15; 358/1.17

(58) Field of Classification Search  
None  
See application file for complete search history.

(56) References Cited

U.S. PATENT DOCUMENTS

| | | | | |
|---|---|---|---|---|
| 5,136,688 A | * | 8/1992 | Morikawa et al. | 358/1.16 |
| 2003/0160977 A1 | * | 8/2003 | Nishikawa et al. | 358/1.2 |
| 2007/0236739 A1 | * | 10/2007 | Murakami et al. | 358/3.06 |
| 2009/0040561 A1 | * | 2/2009 | Sasaki | 358/1.18 |
| 2009/0244610 A1 | | 10/2009 | Mizutani et al. | |
| 2010/0135687 A1 | * | 6/2010 | Le | 399/82 |
| 2010/0253972 A1 | * | 10/2010 | Ishikawa et al. | 358/1.15 |
| 2011/0075165 A1 | * | 3/2011 | Hayakawa | 358/1.9 |
| 2011/0102835 A1 | * | 5/2011 | Tokumoto | 358/1.15 |

FOREIGN PATENT DOCUMENTS

| | | |
|---|---|---|
| JP | A 10-58770 | 3/1998 |
| JP | A-2000-203102 | 7/2000 |
| JP | A-2001-312383 | 11/2001 |
| JP | A 2006-31086 | 2/2006 |
| JP | A 2009-241524 | 10/2009 |

OTHER PUBLICATIONS

Apr. 15, 2014 Office Action issued in Japanese Patent Application No. 2011-065744 (with translation).

* cited by examiner

*Primary Examiner* — Vincent Rudolph  
(74) *Attorney, Agent, or Firm* — Oliff PLC

(57) ABSTRACT

An image data processing system, includes a plurality of first units that interpret data of assigned logical pages included in document data described in a page description language, generate intermediate data of the logical pages, divide the generated intermediate data of the logical pages into intermediate data on the basis of logical sections which are sections on the logical pages, and output the divided intermediate data; and a plurality of second units that correspond to physical sections which are sections on a physical page, generate print image data from intermediate data of a plurality of logical sections included in corresponding physical sections from among the intermediate data of the logical sections on the logical pages generated by the plurality of first units, and output the generated print image data to a printer.

6 Claims, 10 Drawing Sheets

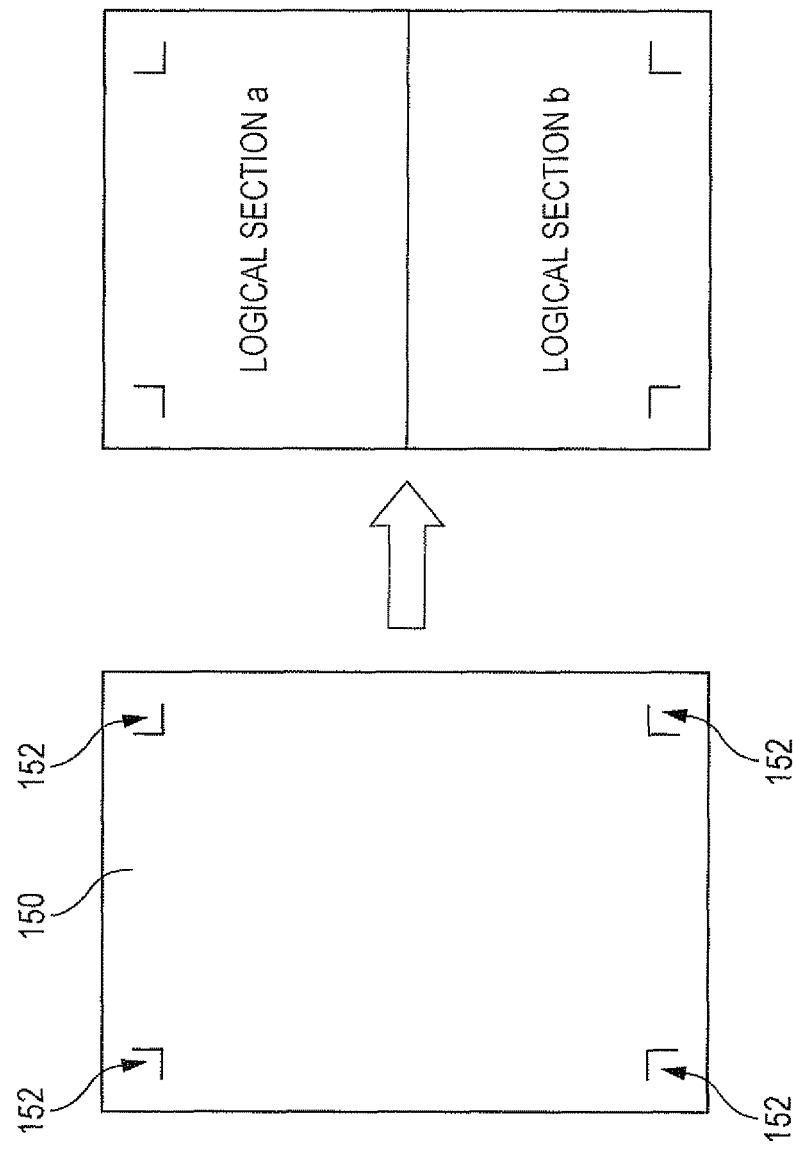

PROCESSING OF LOGICAL PAGE DATA FOR A PRINTER

CROSS-REFERENCE TO RELATED APPLICATIONS

This application is based on and claims priority under 35 USC 119 from Japanese Patent Application No. 2011-065744 filed Mar. 24, 2011.

BACKGROUND (i) Technical Field

The present invention relates to an image data processing system.

(ii) Related Art

To increase the speed of print output, there is known a technique that performs parallel processing for print data by plural raster image processors (RIPs). A RIP is a device that develops data described in a page description language (hereinafter, referred to as PDL) such as the PostScript (registered trademark), into print image data, such as raster data or interval Data, that a print engine is able to handle. The processing for developing the PDL data into the print image data is occasionally called RIP processing.

Also, there is known an imposition function that arranges plural processing units (for example, pages) described in PDL data on one surface of a sheet side by side, or in a manner that the units are partially or completely superposed on each other. An example of the imposition function is n-up. Here, n is a natural number of two or larger. n-up is processing for printing n pages described in PDL data on one page of a sheet side by side. Also, another example of the imposition function is processing for completely superposing an image of a single logical page on an image of another logical page.

Hereinafter, a page defined with description in PDL data is called "logical page," and a page of a sheet is called "physical page." Hence, for example, 2-up represents printing two logical pages by arranging the two logical pages on a single physical page. In the case of a cut sheet, one of both surfaces of a cut sheet is typically a physical page. In the case of a rolled sheet, one of both surfaces a single sheet in the form of a final product after cutting (for example, a sheet of a book) is typically a single physical page.

The imposition processing arranges print image data of plural logical pages (or bands obtained by dividing the plural logical pages) subjected to the imposition, side by side or in a manner that the logical pages are partially or completely superposed, on a page buffer that holds print image data for a single physical page, or a band buffer that hold raster image data of bands obtained by dividing a single physical page into bands each having a predetermined number of pixel lines; and supplies the image data for the physical page formed on the buffer to a print engine in order of raster scanning.

SUMMARY

According to an aspect of the invention, there is provided an image data processing system including a plurality of first units that interpret data of assigned logical pages included in document data described in a page description language, generate intermediate data of the logical pages, divide the generated intermediate data of the logical pages into intermediate data on the basis of logical sections which are sections on the logical pages, and output the divided intermediate data; and a plurality of second units that correspond to physical sections which are sections on a physical page, generate print image data from intermediate data of a plurality of logical sections included in corresponding physical sections from among the intermediate data of the logical sections on the logical pages generated by the plurality of first units, and output the generated print image data to a printer.

BRIEF DESCRIPTION OF THE DRAWINGS

Exemplary embodiment(s) of the present invention will be described in detail based on the following figures, wherein:

FIG. 10 is an illustration for explaining register marks.

DETAILED DESCRIPTION

An exemplary embodiment of the present invention is described below with reference to the drawings.

Figure 1:
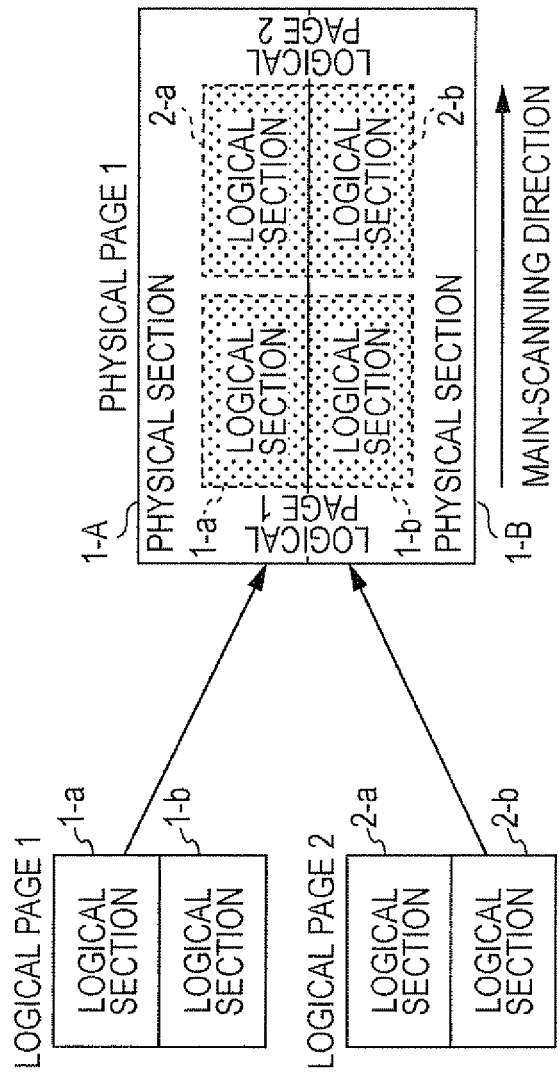
FIG. 1 is an illustration showing an example of dividing methods of a logical page and a physical page, and a correspondence relationship between logical sections and physical sections.

Referring to FIG. 1, described first is an example when 2-up processing is performed, in which two logical pages are arranged and printed on a single physical page. In the example in FIG. 1, a logical page 1 and a logical page 2 are arranged on a physical page 1. In the drawing, it is assumed that a direction from left to right is a main-scanning direction of a print operation in order of raster scanning by a print engine. For example, in the case of a print engine of an electrophotographic system using a raster output scanner (ROS), the main-scanning direction is a scanning direction of a laser beam for a rotating photoconductor. In the case of a print engine of an inkjet system, the main-scanning direction is a scanning direction of a print head. A sub-scanning direction with respect to the main-scanning direction is a direction orthogonal to the main-scanning direction. For example, in the case of the electrophotographic system, the sub-scanning direction is a rotation direction of the photoconductor. In the case of the inkjet system, the sub-scanning direction is a moving direction of a sheet.

As shown in FIG. 1, the logical page 1 is divided into a logical section 1-*a*, which is an upper half section, and a logical section 1-*b*, which is a lower half section. Also, the logical page 2 is divided into a logical section 2-*a*, which is an upper half section, and a logical section 2-*b*, which is a lower half section. Regarding identification numbers "1-*a*" and "1-*b*" indicative of the logical sections, first signs "1" and "2" expressed by numbers at former positions indicate logical-page numbers, and second signs "a" and "b" expressed by lowercase letters of the alphabet at latter positions indicate section numbers in a single logical page. In the example in FIG. 1, a logical page is divided into two logical sections in the sub-scanning direction. Each logical section corresponds to a "band" including plural continuous image lines (in the main-scanning direction).

Also, in the example in FIG. 1, the physical page 1 is divided into a physical section 1-A, which is an upper half section, and a physical section 1-B, which is a lower half section. Regarding identification numbers "1-A" and "1-B" indicative of the physical sections, first signs "1" and "2" expressed by numbers at former positions indicate physical-page numbers, and second signs "A" and "B" expressed by uppercase letters of the alphabet at latter positions indicate section numbers in a single physical page. In the example in FIG. 1, a physical page is divided into two physical sections in the sub-scanning direction. Each physical section corresponds to a "band." As shown in the drawing, the physical section 1-A includes the logical page 1-*a* and the logical page 2-*a*, and the physical section 1-B includes the logical page 1-*b* and the logical page 2-*b*.

Figure 2:
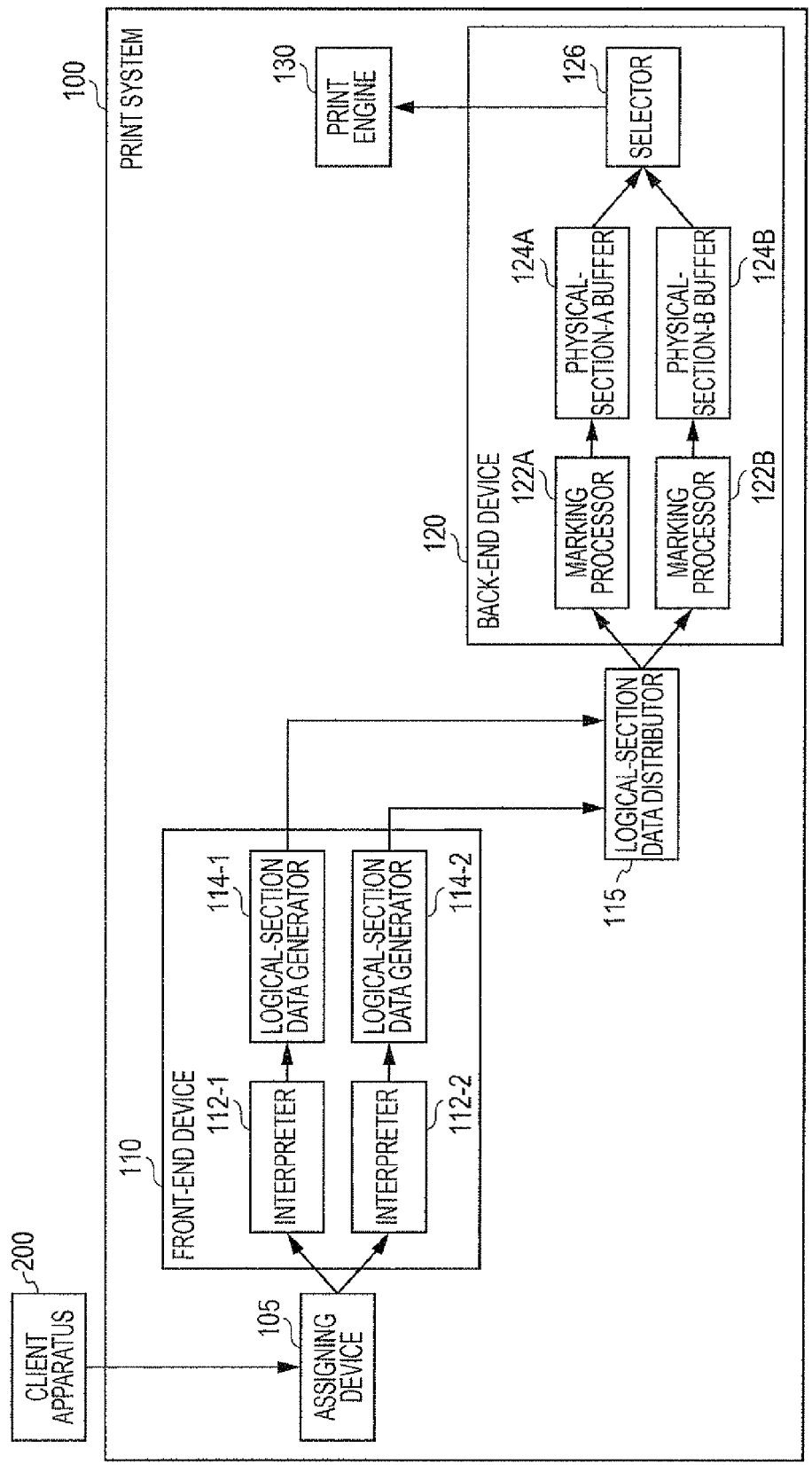
FIG. 2 is a functional block diagram showing an example of a configuration of a print system for processing based on the example of the dividing methods in FIG. 1.

An example of a configuration of a print system for 2-up processing is described based on the above-described division into sections, with reference to FIG. 2.

Referring to FIG. 2, a print system 100 according to this exemplary embodiment includes an assigning device 105, a front-end device 110, a logical-section data distributor 115, a back-end device 120, and a print engine 130.

The assigning device 105 assigns corresponding pages to interpreters 112-1 and 112-2 (hereinafter, collective called "interpreter(s) 112" if the interpreters do not have to be particularly distinguished from each other) in plural systems (in the illustrated example, two systems) included in the front-end device 110. That is, in this example, logical pages are distributed to the corresponding interpreters 112.

More specifically, when the assigning device 105 receives print data in a page description language (PDL) from a client apparatus 200 through a network such as a local area network (LAN), for example, the assigning device 105 transfers the print data to the interpreters 112-1 and 112-2 of the front-end device 110. This transfer is processing when the print data is page-dependent print data. Then, the assigning device 105 assigns processing of respective pages to the interpreters 112-1 and 112-2 in order from a top page of the print data. The pages may be assigned to the interpreters 112 in a predetermined fixed order. Alternatively, each interpreter 112 may notify the assigning device 105 every time when the interpreter 112 completes the processing of an assigned page. In response to the notification, the assigning device 105 may assign a top page of remaining pages, which are not processed yet, to the interpreter 112 that gave the notification. These configurations are merely examples, and another assignment system may be used. Hereinafter, for example, a logical page with an odd page number is assigned to the interpreter 112-1 and a logical page with an even page number is assigned to the interpreter 112-2.

The assigning device 105 may be included in the front-end device 110 (for example, may be installed as a program), or may be built on a computer device that is provided separately from the front-end device 110 or the back-end device 120.

The front-end device 110 receives a print request including the print data described in the PDL from the assigning device 105, and converts the print data into intermediate data. The front-end device 110 includes the two interpreters 112-1 and 112-2, and two logical-section data generator 114-1 and 114-2 (hereinafter, collectively called "logical-section data generator(s) 114" if the generators do not have to be particularly distinguished from each other). A pair of the interpreter 112-1 and the logical-section data generator 114-1 defines a first system, and a pair of the interpreter 112-2 and the logical-section data generator 114-2 defines a second system.

The interpreters 112 interpret the print data in PDL in order from the top, and based on the interpretation results, generate the intermediate data of the logical pages respectively assigned to the interpreters 112. The intermediate data is, for example, a display list. Alternatively, the intermediate data may be interval data obtained such that objects (for example, letter's fonts, graphics, image data), which are image elements forming an image of a page, are divided into intervals on a scanning-line basis of raster scanning. The interval data is data indicative of an interval on a single scanning line occupied by an object. For example, the interval data is expressed by a pair of coordinates at both ends of the interval. The interval data may include information that defines pixel values of pixels within the section. A pixel value is a density value (gray level) of each of basic colors, such as C, M, Y, and K that are used by the print engine 130. The intermediate data may not be a display list or interval data, and may be in any of data forms that express data amount with an intermediate level between a PDL and a bitmap image (raster image).

More specifically, the interpreters 112 interpret the print data the in PDL received from the assigning device 105 in order from the top. This interpretation processing is performed not only for the pages respectively assigned to the interpreters 112, but also for all pages from the top. This is because a page-dependent page description language is expected. In particular, a page description language of a type, in which a change in inside state of each interpreter 112 by a command for a previous page affects interpretation of a next page, is expected. Then, the interpretation results relating to the logical pages respectively assigned to the interpreters 112 by the assigning device 105 (and the inside states of the interpreters 112 at this time) are used, to generate the intermediate data including primitive data (individual commands that form the display list, interval data, etc.) for the objects in the logical pages.

If the print data is described in a page-independent page description language, the assigning device 105 may divide the print data into data on the basis of logical pages, and assign the divided data to the respective interpreters 112.

If the print data is described in a page-dependent page description language, the assigning device 105 may interpret the print data, convert the data into data in a page-independent page description language, divide the converted data into data on the basis of logical pages, and assign to the respective interpreters 112.

In either case, the interpreters 112-1 and 112-2 generate the intermediate data for the respective logical pages assigned by the assigning device 105, and give the generated intermediate data to the corresponding logical-section data generators 114-1 and 114-2.

The logical-section data generators 114-1 and 114-2 divide the received intermediate data of the logical pages into data on the basis of the logical sections, to generate the intermediate data of the logical sections. That is, in the example shown in FIGS. 1 and 2, intermediate data of a single logical page n (n is a natural number) is divided into data of an upper logical section n-*a* and data of a lower logical section n-*b*. Hereinafter, intermediate data of an individual logical section is called "logical-section data."

In generation processing of the logical-section data, for example, the interpreter 112 writes intermediate data for a single logical page in a page buffer memory, and then the logical-section data generator 114 located downstream of the interpreter 112 divides and outputs the intermediate data of the logical page in the buffer memory into data on the basis of logical sections. Alternatively, every time when intermediate data for a single logical section is accumulated in the buffer memory, the logical-data generator 114 may output the data of that logical section.

The logical-section data output from the logical-section data generators 114-1 and 114-2 is input to the logical-section data distributor 115.

For example, the above-described front-end device 110 may be realized such that a single CPU (central processing unit) executes a program describing the function of the interpreter 112 and a program describing the function of the logical-section data generator 114 by two processes or threads. In this case, if the CPU is a multi-core CPU having four or more cores, parallel processing may be performed such that the respective cores execute different processes or threads. Of course, a two-core CPU may be used and each core may execute two processes or threads. In the case of a multi-CPU computer having four or more CPUs, parallel processing may be performed such that each CPU executes different processes or threads. Alternatively, in the case of a computer having two CPUs, each CPU may execute two processes or threads.

The logical-section data distributor 115 distributes the logical-section data (intermediate data) input from the logical-section data generators 114-1 and 114-2 to two marking processors 122A and 122B in the back-end device 120 (hereinafter, collectively called "marking processor(s) 122" if the processors do not have to be particularly distinguished from each other). In this exemplary embodiment, plural pieces of the logical-section data belonging to the same section from among physical sections that form a physical page are distributed to the marking processors 122 corresponding to that physical section (the detail will be given later).

The back-end device 120 converts the logical-section data (intermediate data) generated by the front-end device 110 into print image data that the print engine 130 is able to handle, and supplies the print image data to the print engine 130. For example, the print image data is image data with raster system (including a bitmap image system) or interval Data system.

The back-end device 120 includes the two marking processors 122A and 122B, two physical-section buffers 124A and 124B (hereinafter, collectively called "physical-section buffer(s) 124" if the buffers do not have to be particularly distinguished from each other). A pair of the marking processor 122A and a physical-section-A buffer 124A defines a first system, and a pair of the marking processor 122B and a physical-section-B buffer 124B defines a second system.

As shown in FIG. 1, the physical-section-A buffer 124A is a buffer memory on which print image data of a physical section A that is an upper half section of a physical page is written. Also, as shown in FIG. 1, the physical-section-B buffer 124B is a buffer memory on which print image data of a physical section B that is a lower half section of a physical page is written.

The marking processor 122A receives intermediate data (logical-section data) of plural logical sections belonging to the physical section A from the logical-section data distributor 115, performs rendering processing successively for the logical-section data, hence generates print image data of the logical sections, and writes the generated data on the physical-section-A buffer 124A. Similarly, the marking processor 122B receives logical-section data of plural logical sections belonging to the physical section B from the logical-section data distributor 115, performs rendering processing successively for the logical-section data, hence generates print image data of the logical sections, and writes the generated data on the physical-section-B buffer 124B. Each marking processor 122 performs rendering processing for the intermediate data of the logical sections included in the corresponding physical section in rendering order of the logical sections (the order corresponding to a rendering order of logical pages including logical sections). The marking processor 122 writes print image data, which is obtained as the result of the processing, to the corresponding physical-section buffer 124.

If logical pages are superposed on each other (although the logical pages on the physical page are not superposed on each other in the example shown in FIG. 1), the marking processor 122 writes the rendered result of a lower layer logical-section data on the physical-section buffer 124, and then writes the rendered result of an upper layer logical-section data on the physical-section buffer 124. The up-down relationship of the logical sections may be instructed, for example, from the logical-section data distributor 115 to the marking processor 122 based on setting information or the like of imposition included in the print data in PDL or the like.

The marking processors 122A and 122E each may be formed of a hardware circuit, for example, an application specific integrated circuit (ASIC), or a programmable logic device, such as a field programmable gate array (FPGA) or a dynamically reconfigurable processor (DRP). Alternatively, the marking processors 122A and 122B may be realized by a single-core or multi-core processor (CPU or the like) or plural processors by parallel processing by executing a program that defines the function of the marking processors 122. The physical-section buffers 124 each may be formed of a semiconductor memory.

Though not illustrated, a processor that performs additional processing may be provided for print image data (for example, raster data) of each physical section. The additional processing is one of halftone processing, gamma-conversion processing corresponding to color reproduction characteristics of the print engine 130, and data conversion of print image data in order of bit array of the print engine 130, or a combination of these. For example, the processor for the additional processing may be provided downstream of each physical-section buffer 124, and print image data output from each physical-section buffer 124 may be processed. Alternatively, the processor may be provided between the marking processor 122 and the physical-section buffer 124 corresponding thereto. The additional processing may be performed for pixel data or interval Data that is successively output from the marking processor 122, and then the processing result may be written on the physical-section buffer 124.

In this example, since the two marking processors 122A and 122B are operated in parallel, rendering may be performed at a speed that is twice higher than a speed in a case where a single marking processor performs rendering for a single physical page. It is to be noted that a rendering start timing of the physical section A by the marking processor 122A does not have to be the same as a rendering start timing of the physical section B by the marking processor 122B. For example, as described later, since the physical section A is written on a sheet before the physical section B is written on the sheet, rendering of the physical section A may be started first. For example, the logical-section data distributor 115 may distribute the logical-section data included in the physical section A to the marking processor 122A first, from among the logical section data belonging to the single physical page, and then distribute the logical section data included in the physical section B to the marking processor 122B.

A selector 126 alternately selects the physical-section-A buffer 124A and the physical-section-B buffer 124B, and outputs print image data of a physical section accumulated in the selected physical-section buffer 124 to the print engine 130. In the example of the dividing methods shown in FIG. 2, the selector 126 connects the physical-section-A buffer 124A that is the earlier one in order of raster scanning with the print engine 130, and supplies the print image data of the physical section A in the buffer 124 (an upper half band of the physical page) to the print engine 130. Then, the selector 126 connects the physical-section-B buffer 124B with the print engine 130, and supplies the print image data of the physical section B (a lower half band of the physical page) to the print engine 130 in order of raster scanning. The selector 126 may be formed of a hardware circuit, or may be mounted as an element of a control program executed by the CPU of the back-end device 120.

As described above, in the print system 100 shown in FIG. 1, a device for processing print data in PDL into print image data is divided into two-phase devices including the upstream front-end device 110 that converts PDL data into intermediate data, and the downstream back-end device 120 that converts the intermediate data into print image data. By dividing the device, a parallel attribute (i.e., an attribute or viewpoint when data is divided and distributed to parallel processing) at the upstream side is different from a parallel attribute at the downstream side. In this exemplary embodiment, the front-end device 110 performs parallel processing on a logical-page basis, and the back-end device 120 performs parallel processing on a physical-section basis. For changing the parallel attribute, the front-end device 110 divides the intermediate data of each generated logical page into data of logical sections, and the logical-section data distributor 115 groups the intermediate data of the logical sections in accordance with a physical section that is a unit of parallelization at the downstream side. Assuming that the physical section is a band, if print image data of bands rendered in parallel is supplied to the print engine 130 in order of bands, a merit of an increase in speed of rendering processing by parallelization may be obtained. Also, the marking processor 122 for a physical section writes images of plural logical sections originated from plural logical pages, on the physical-section buffer 124 for that physical section in order. Accordingly, imposition processing is also realized.

An exemplary configuration of the print system 100 has been described above. Next, a flow of an operation of the system shown in FIG. 2 will be described in detail with reference to FIGS. 3 to 5.

Figure 3:
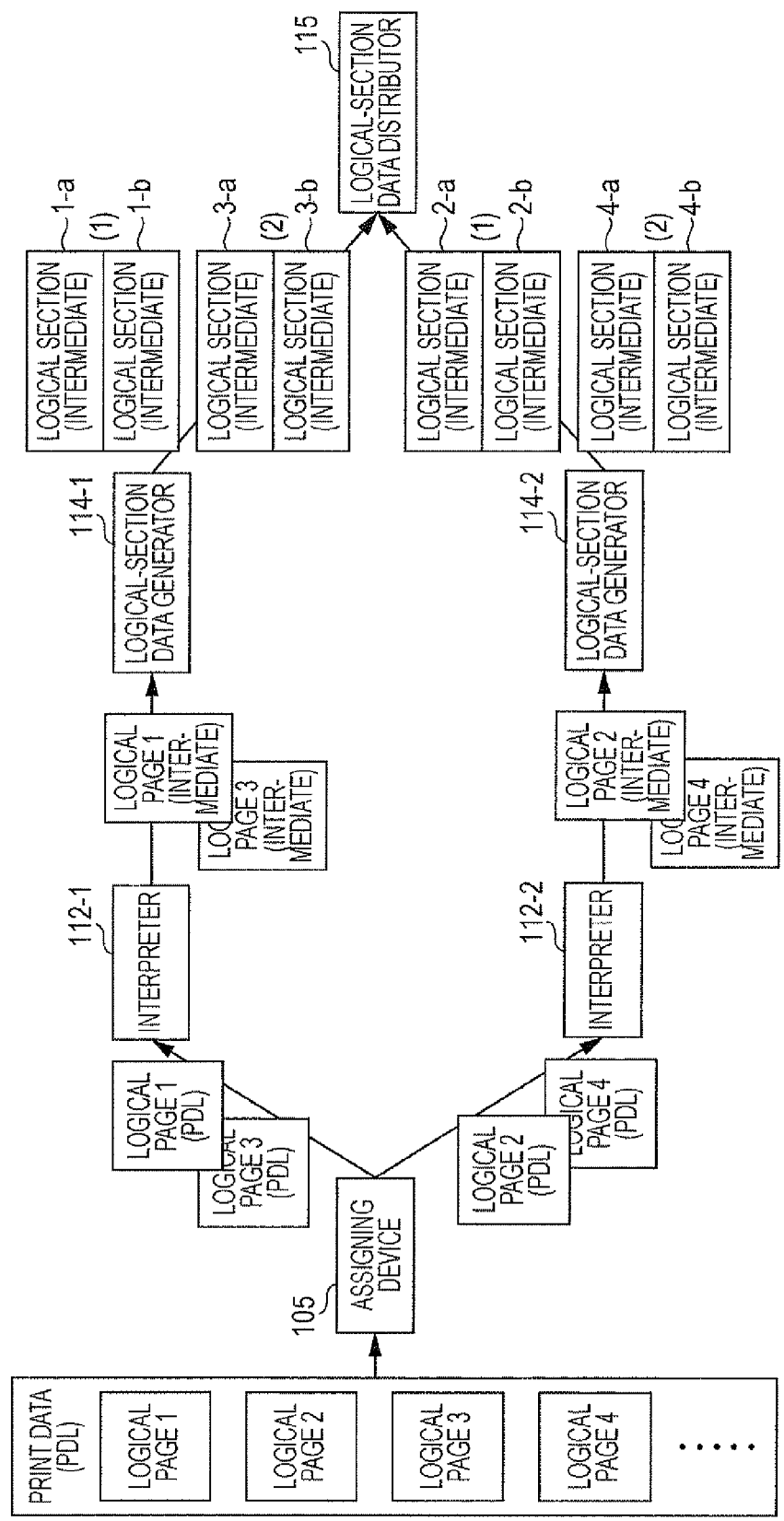
FIG. 3 is an illustration for explaining a flow of data in an upstream portion of the print system in FIG. 2.

As shown in FIG. 3, print data described in PDL is input from the client apparatus 200 to the assigning device 105. The print data includes information relating to plural logical pages. Though not shown, it is assumed that the print data includes an instruction of 2-up (or processing for printing two logical pages in a superposed manner). The assigning device 105 assigns a logical page with an odd page number to the interpreter 112-1 and a logical page with an even page number to the interpreter 112-2 in order from a top logical page in the print data. For example, logical pages 1 and 3 are assigned to the interpreter 112-1, and logical pages 2 and 4 are assigned to the interpreter 112-2. The interpreters 112-1 and 112-2 generate intermediate data of the logical pages 1 and 3, and intermediate data of the logical pages 2 and 4, and give the data to the corresponding logical-section data generators 114-1 and 114-2.

The logical-section data generator 114-1 divides the intermediate data of the logical page 1, which is sent from the interpreter 112-1 first, into intermediate data of a logical section 1-$a$, which is an upper half band in the sub-scanning direction, and intermediate data of a logical section 1-$b$, which is a lower half band. The generated intermediate data of the logical section 1-$a$ and intermediate data of the logical section 1-$b$ are given to the logical-section data distributor 115. Similarly, the logical-section data generator 114-2 divides the intermediate data of the logical page 2, which is sent from the interpreter 112-2 first, into intermediate data of a logical section 2-$a$ and intermediate data of a logical section 2-$b$. The generated intermediate data of the logical section 2-$a$ and intermediate data of the logical section 2-$b$ are given to the logical-section data distributor 115. Then, the logical-section data generators 114-1 and 114-2 divide intermediate data of a logical page 3 and intermediate data of a logical page 4, which are successively input, respectively into two logical sections 3-$a$ and 3-$b$ and two logical sections 4-$a$ and 4-$b$ similarly, and successively transfer them to the logical-section data distributor 115. In FIG. 3, numbers "(1)" and "(2)" are provided for pairs of logical-section data sent from the logical-section data generators 114-1 and 114-2 to the logical-section data distributor 115. The numbers indicate the order in which the pairs are sent from the logical-section data generators 114-1 and 114-2 to the logical-section data distributor 115. In other drawings, like FIG. 3, the parenthesized numbers like "(1)" and "(2)" indicate the order in which data is sent from an upstream device to a downstream device.

Figure 4:
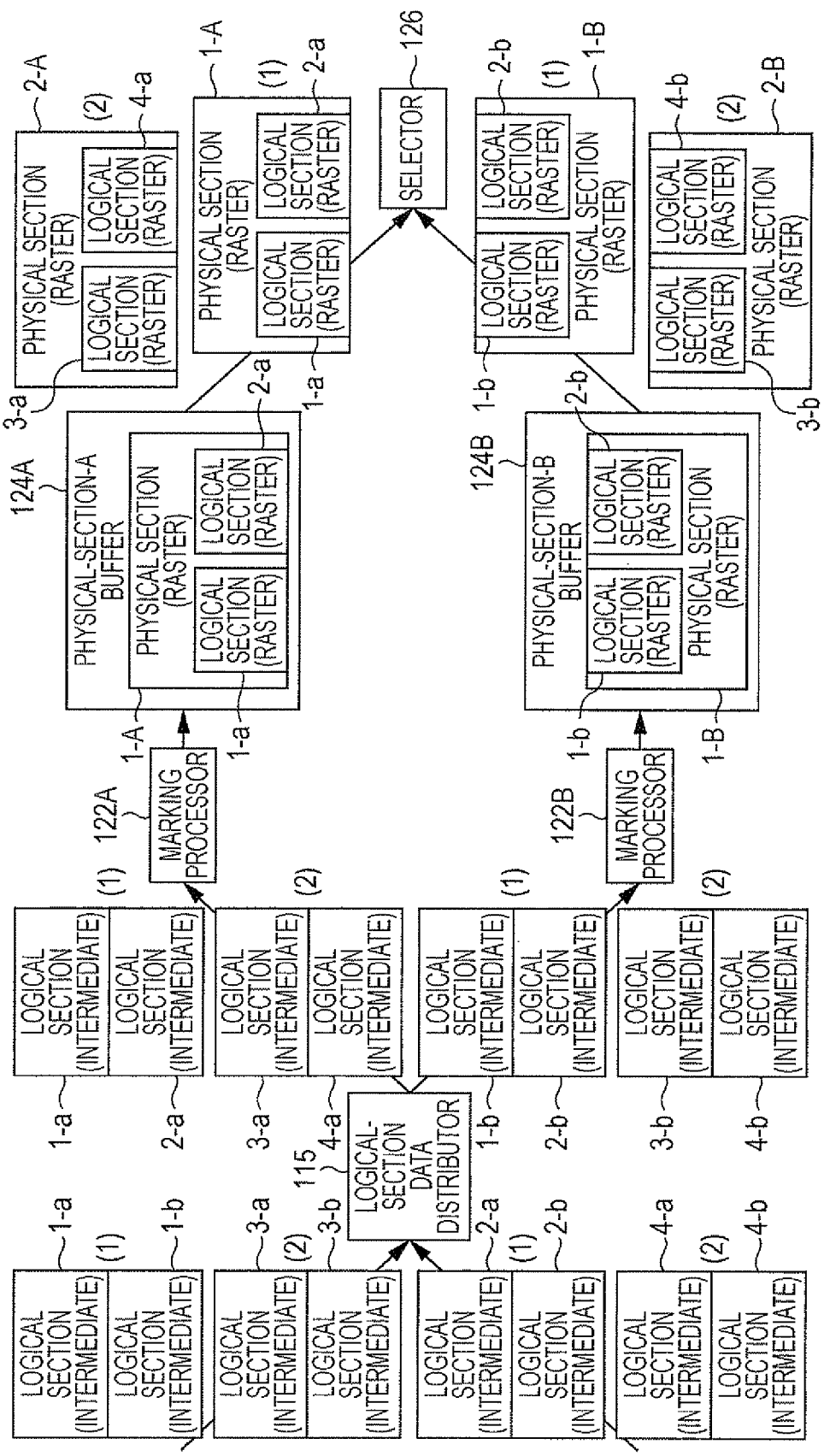
FIG. 4 is an illustration for explaining a flow of data in a middle portion of the print system in FIG. 2.

Referring to FIG. 4, when the logical-section data distributor 115 receives intermediate data of logical sections included in, for example, a single physical page, from the upstream plural logical-section data generators 114, the logical-section data distributor 115 changes the order of data to group the data according to physical sections to which the logical sections belong, and distributes the data to the marking processors 122 corresponding to the physical sections. In the example in FIG. 4, intermediate data of logical sections 1-$a$ and 2-$a$ belonging to a physical section 1-A of a first physical page is transferred to the marking processor 122A corresponding to a physical section A. Also, intermediate data of logical sections 1-$b$ and 2-$b$ belonging to a physical section 1-B of the first physical page is transferred to the marking processor 122B corresponding to a physical section B. Then, intermediate data of logical sections 3-$a$ and 4-$a$ belonging to a physical section 2-A of a second physical page is transferred to the marking processor 122A, and intermediate data of logical sections 3-$b$ and 4-$b$ belonging to a physical section 2-B of the second physical page is transferred to the marking processor 122B.

The logical-section data distributor 115 has mapping information indicative of correspondence between a physical section of a physical page and logical sections of continuous plural logical pages. The logical-section data distributor 115 distributes logical-section data to the marking processors 122 based on this mapping information. For example, in the example of 2-up shown in FIG. 1, the mapping information indicates that an upper logical section ($2k$-1)-$a$ of an odd page and an upper logical section ($2k$)—a of an even page are mapped in a physical section k-A (k is a natural number), and that a lower logical section ($2k$-1)-$b$ of an odd page and a lower logical section ($2k$)-$b$ of an even page are mapped in a physical section k-B. The mapping information may be previously set in the logical-section data distributor 115, or may be included in, for example, print data or control information pertaining to the print data and may be transmitted to the logical-section data distributor 115.

The marking processor 122A successively renders (rasterizes) the intermediate data of the logical sections 1-*a* and 2-*a* received from the logical-section data distributor 115, and writes print image data, which is the rendered result, on the physical-section-A buffer 124A. Accordingly, the pint image data (for example, raster data) of the physical section 1-A, which is an upper half band of a physical page, is formed on the physical-section-A buffer 124A. Similarly, the marking processor 122E successively renders the intermediate data of the logical sections 1-*b* and 2-*b* received from the logical-section data distributor 115, and writes print image data, which is the rendered result, on the physical-section-B buffer 124B. Accordingly, the pint image data of the physical section 1-B, which is a lower half band of the physical page, is formed on the physical-section-B buffer 124B. The print image data formed on the physical-section buffers 124 is successively selected by the selector 126, and is sent to the print engine 130. Then, similarly, the marking processor 122A writes print image data of the physical section 2-A of a second physical page on the physical-section-A buffer 124A, and the marking processor 122B writes print image data of the physical section 2-B of the second physical page on the physical-section-B buffer 124B. Then, the print image data of the respective physical sections of the second physical page is successively selected by the selector 126, and is sent to the print engine 130.

Figure 5:
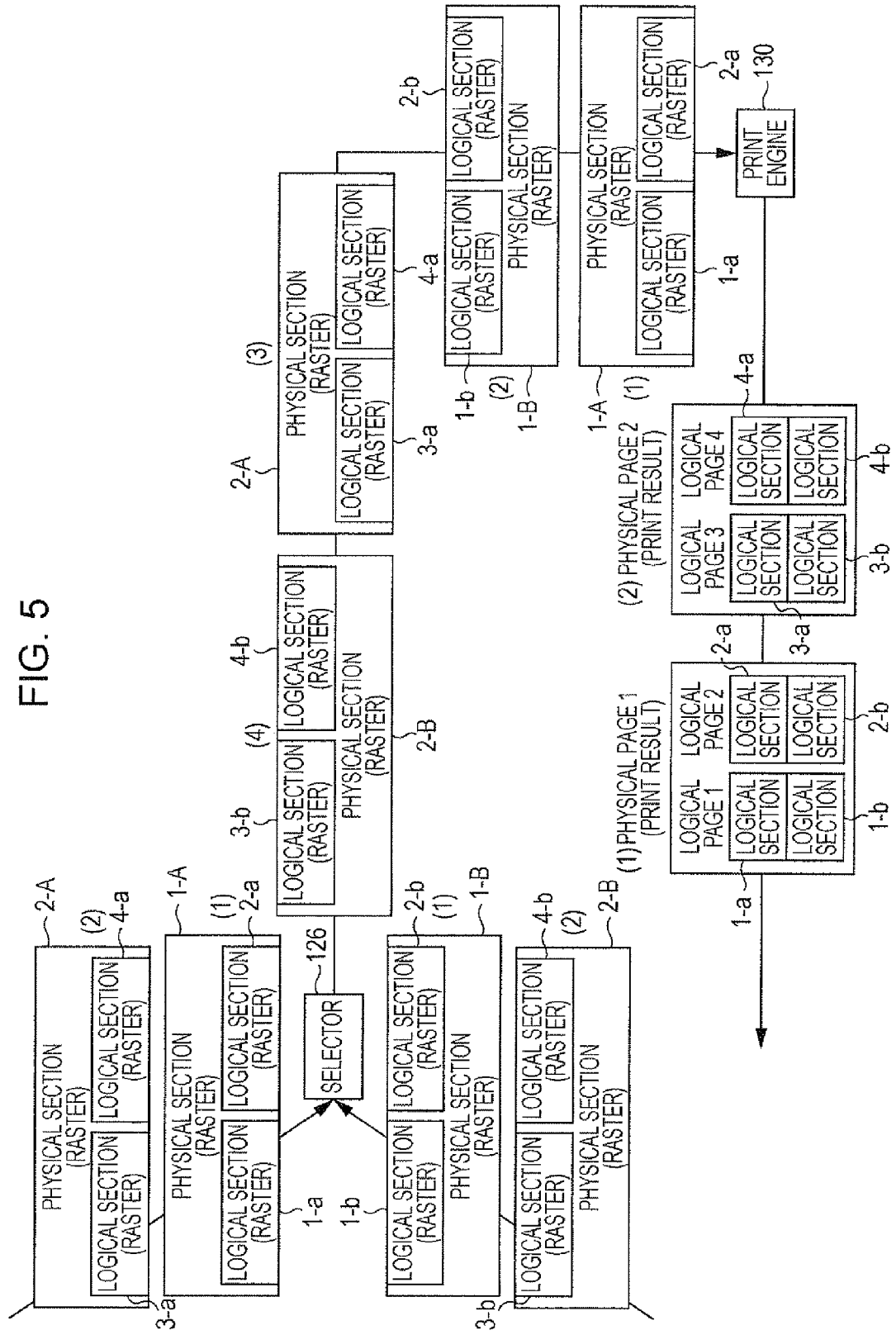
FIG. 5 is an illustration for explaining a flow of data in a downstream portion of the print system in FIG. 2.

In other words, as shown in FIG. 5, the selector 126 selects the physical-section-A buffer 124A first and sends the print image data of the physical section 1-A to the print engine 130. The selector 126 selects the physical-section-B buffer 124B next, and sends the print image data of the physical section 1-B to the print engine 130. Then, the respective physical-section buffers 124 are selected in the same order, and hence print image data of the physical sections 2-A and 2-B is sent to the print engine 130 in that order.

The print engine 130 performs printing on a sheet in order of raster scanning based on pixel values of the successively input print image data of the physical sections (in the case of interval Data, based on pixel values after the data is converted into data on a pixel basis). For example, when a rolled sheet is used as a sheet, the print engine 130 prints the print image data of the physical section 1-A, which is input first, on an upper half of a first page region of the sheet, and then prints the print image data of the physical section 1-B, which is input next, on a lower half of the same region of the sheet. Accordingly, the print result of the physical page 1 is formed on the sheet. Then, the print engine 130 prints an image of the physical section 2-A on an upper half of a second page region of the sheet, and then prints an image of the physical section 2-B on a lower half of the same region. Accordingly, a print image of the physical page 2 is formed on the sheet.

The example in which logical pages are printed on a single physical page by 2-up has been described above. In the above example, two logical pages are arranged side by side on a single physical page and printed. Alternatively, a similar system configuration and similar processing content may be applied even if two logical pages are completely or partly superposed on each other and printed.

In the above example, two bands, which are obtained by dividing a physical page into two in the sub-scanning direction, serve as physical sections. Alternatively, a physical page may be divided into three or more bands in the sub-scanning direction. In this case, pairs of marking processors 122 and physical-section buffers 124 may be provided by a number corresponding to the number of divided bands, and parallel processing may be performed.

The number of pairs of marking processors 122 and physical-section buffers 124 included in the back-end device 120 do not have to be the same as the number of divided bands. If the number of divided bands is larger than the number of pairs, each pair may render plural bands (in this case, physical sections), for example, by time division, and the rendered results may be output. In contrast, if the number of pairs is larger than the number of divided bands, only the pairs the number of which corresponds to the number of divided bands may be operated. Alternatively, the pairs the number of which corresponds to the number of divided bands may perform rendering processing of respective bands of a physical page, and simultaneously, the remaining pairs may perform rendering processing for a band group of a next physical page, the group which is at an earlier turn in order of raster scanning.

In the above example, the number of divided bands of the back-end device 120 is two, and hence the logical page is divided into two upper and lower bands (physical sections A and B) by the front-end device 110. However, it is not limited thereto. For example, the number of divided bands of a logical page by the front-end device 110 may be larger than the number of divided bands of a physical page by the back-end device 120.

Also, in the above example of the 2-up processing, parallel processing is performed for the two logical pages by providing the two interpreters 112 in the front-end device 110. However, this is merely an example. Three or more interpreters 112 may be provided, and the interpreters 112 may perform parallel processing on logical pages the number of which corresponds to the number of interpreters 112.

In the above-described example, the logical pages are assigned to the interpreters 112 one by one. Alternatively, continuous several pages may be assigned to each interpreter 112.

In the above-described example, the logical page and the physical page are divided into bands, i.e., in the sub-scanning direction. Based on the concept of this exemplary embodiment, the logical page and the physical page may be divided into tiles, i.e., in both the main-scanning direction and the sub-scanning direction. A modification of division into tiles is shown in FIG. 6.

Figure 6:
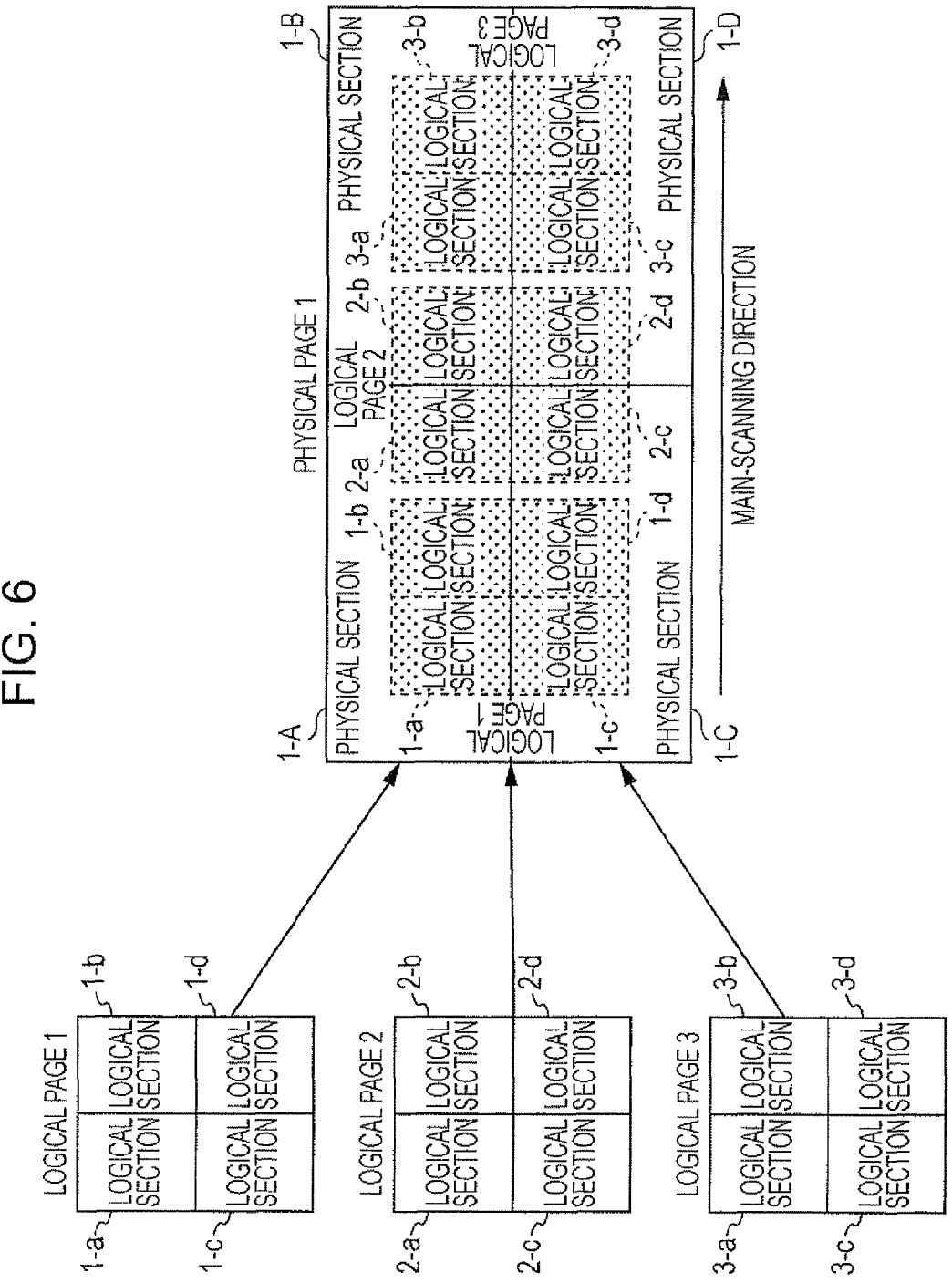
FIG. 6 is an illustration showing another example of dividing methods of a logical page and a physical page, and a correspondence relationship between logical sections and physical sections.

FIG. 6 illustrates an example of 3-up in which three logical pages are arranged side by side on a single physical page. In the example in FIG. 6, a logical page is divided into two in the main-scanning direction and is divided into two in the sub-scanning direction. Accordingly, a single logical page is divided into four tiles. In this example, an individual tile is a single logical section. In the example in FIG. 6, logical sections in upper left, upper right, lower left, and lower right quadrants of a logical page are identified by a, b, c, and d in that order. For example, a logical page 1 is divided into four logical sections 1-*a*, 1-*b*, 1-*c*, and 1-*d*. Also, in the example in FIG. 6, a physical page is divided into two in the main-scanning direction and is divided into two in the sub-scanning direction. Accordingly, a single physical page is divided into four tiles (physical sections). In the example in FIG. 6, physical sections in upper left, upper right, lower left, and lower right quadrants of a physical page are identified by A, B, C, and D in that order.

In the example in FIG. 6, logical pages 1, 2, and 3 are arranged on a physical page 1 from the left. In this case, two upper logical sections 1-*a* and 1-*b* of the logical page 1, and an upper left logical section 2-*a* of the logical page 2 belong to an upper left physical section 1-A of the physical page 1. Similarly, logical sections of respective logical pages are associated with other physical sections as illustrated. In this example, a (3k-2)-th logical page and a 3k-th logical page (k is a natural number) each are distributed to two upper and lower physical sections, and a (3k-1)-th logical page is divided into four and distributed to four physical sections.

Next, an example of a system configuration in the case of 3-up will be described with reference to the dividing methods in FIG. 6.

Figure 7:
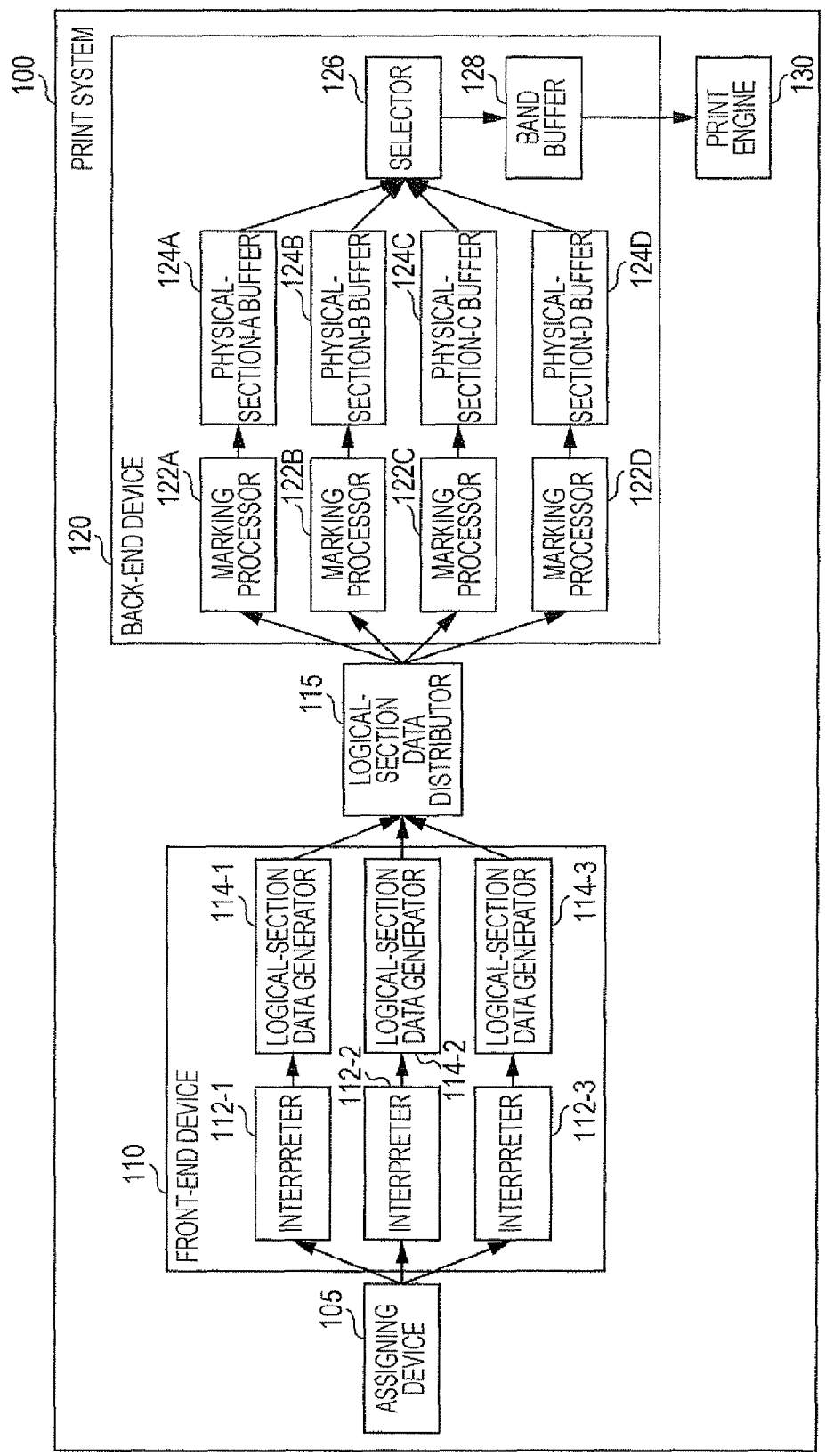
FIG. 7 is a functional block diagram showing an example of a configuration of a print system for processing based on the example of the dividing methods in FIG. 6.

A front-end device 110 of a print system 100 shown in FIG. 7 includes three interpreters 112-1, 112-2, and 112-3 to convert PDL data of three logical pages into intermediate data by parallel processing for 3-up. Logical-section data generators 114-1, 114-2, and 114-3 are respectively provided downstream of the interpreters 112-1, 112-2, and 112-3. Alternatively, pairs of interpreters 112 and logical-section data generators 114 may be provided for four or more systems.

A back-end device 120 includes four pairs of marking processors 122 and physical-section buffers 124 respectively for four physical sections A, B, C, and D. In particular, the back-end device 120 includes a marking processor 122A and a physical-section-A buffer 124A for processing of the physical section A; a marking processor 122B and a physical-section-B buffer 124B for processing of the physical section B; a marking processor 122C and a physical-section-C buffer 124C for processing of the physical section C; and a marking processor 122D and a physical-section-D buffer 124D for processing of the physical section D, as exemplarily shown in FIG. 6.

A logical-section data distributor 115 distributes logical-section data input from the logical-section data generators 114 respectively to the marking processors 122 based on mapping information indicative of a correspondence relationship between the logical sections and the physical sections exemplarily shown in FIG. 6.

Each marking processor 122 performs rendering processing for the received logical-section data, and writes print image data of the physical section on the corresponding physical-section buffer 124. The rendering processing is performed in parallel by the four marking processors 122. Hence, rendering is performed at a speed that is four-times higher than a speed when a single marking processor performs rendering for a single physical page. Rasterizing of the physical sections A and B whose turns are relatively earlier in view of raster scanning, may be started earlier than rendering of the physical sections C and D whose turns are relatively later.

A selector 126 successively selects the print image data written on the physical-section buffers 124A to 124D, and writes the data on a band buffer 128. In this example, the band buffer 128 is a buffer memory that holds print image data for a single band when a physical page is divided into two bands in the sub-scanning direction (i.e., up-down direction). In this modification, by dividing the physical page also in the main-scanning direction, the physical page is divided into the plural physical sections. To supply the print image data to a print engine 130 in order of raster scanning, the print image data for the entire width in the main-scanning direction has to be prepared. Thus, this band buffer 128 is provided.

Figure 8:
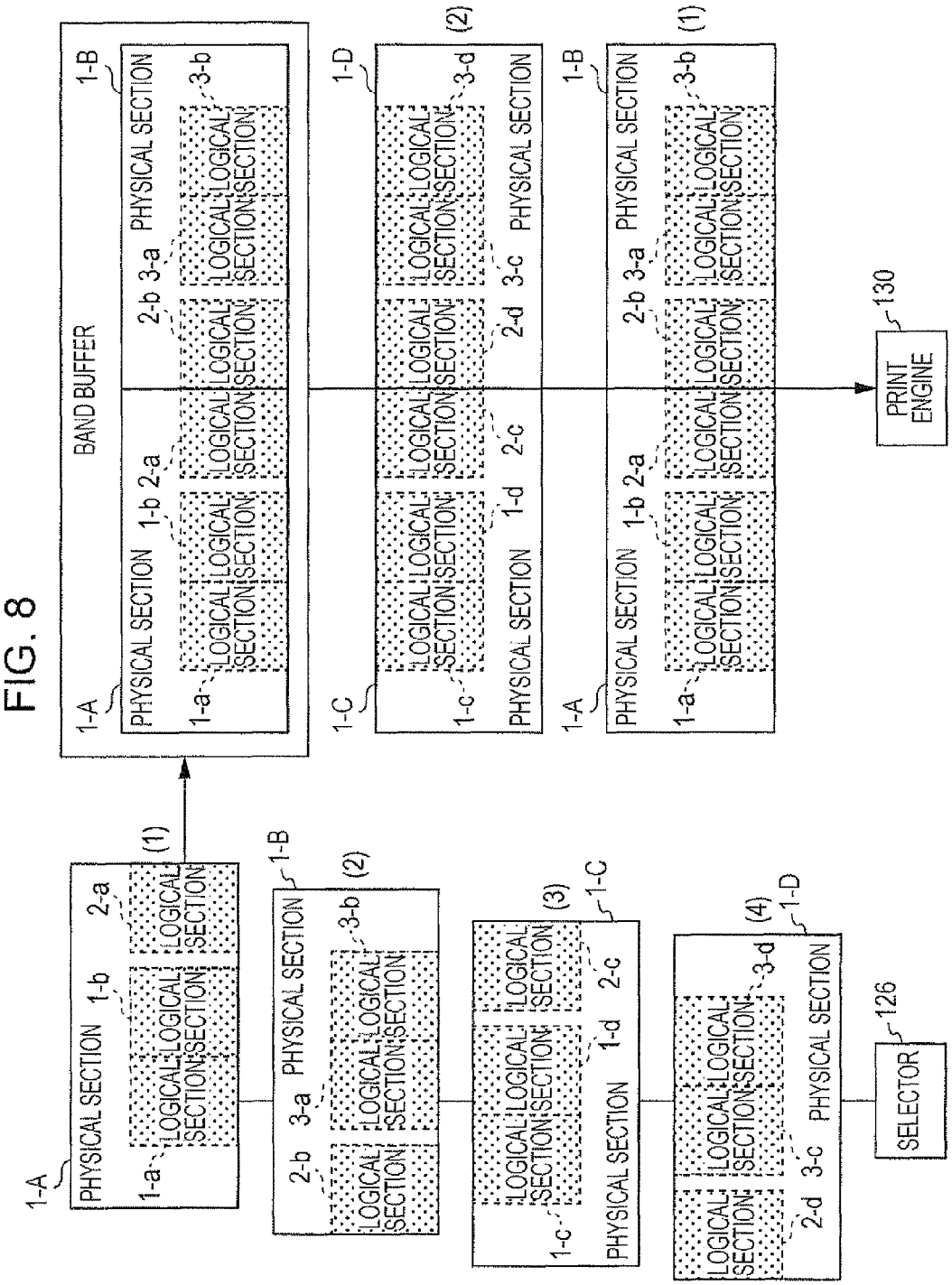
FIG. 8 is an illustration for explaining a flow of data in a portion arranged downstream of a selector of the print system in FIG. 6.

As shown in FIG. 8, the selector 126 successively selects the physical-section-A buffer 124A and the physical-section-B buffer 124B first, writes print image data of the physical section 1-A in a left half of a band of the band buffer 128, and writes print image data of the physical section 1-B in a right half of the band of the band buffer 128. In this way, when the print image data of the band in an upper half of the physical page 1 is accumulated in the band buffer, the print image data in the band buffer 128 is supplied to the print engine 130, in order of raster scanning. Accordingly, an upper half image is printed in an upper half region of the physical page on a sheet. After printing is completed, the selector 126 writes print image data from the physical-section-C buffer 124C and print image data from the physical-section-D buffer 124D on the band buffer 128. In this way, when the print image data of a lower half band of the physical page 1 is accumulated in the band buffer 128, the print image data in the band buffer 128 is supplied to the print engine 130 in order of raster scanning. Accordingly, a lower half image is printed in a lower half region of the physical page on the sheet. Similar processing is repeated for second and more pages of physical pages.

Alternatively, the band buffer 128 may be omitted, and the selector 126 may read print image data for a single scanning line alternately from two physical-section buffers 124 for example, buffers 124A and 124B) corresponding to physical sections belonging to the same band, and may transfer the read data to the print engine 130. The processing of the selector 126 is for reading print image data of plural tiles at equivalent positions in the sub-scanning direction in order of raster scanning, and supplying the read data to the print engine 130.

In the above modification, both the logical page and the physical page are divided into tiles; however, it is merely an example. For example, a logical page may be divided into tiles and a physical page may be divided into bands.

Figure 9:
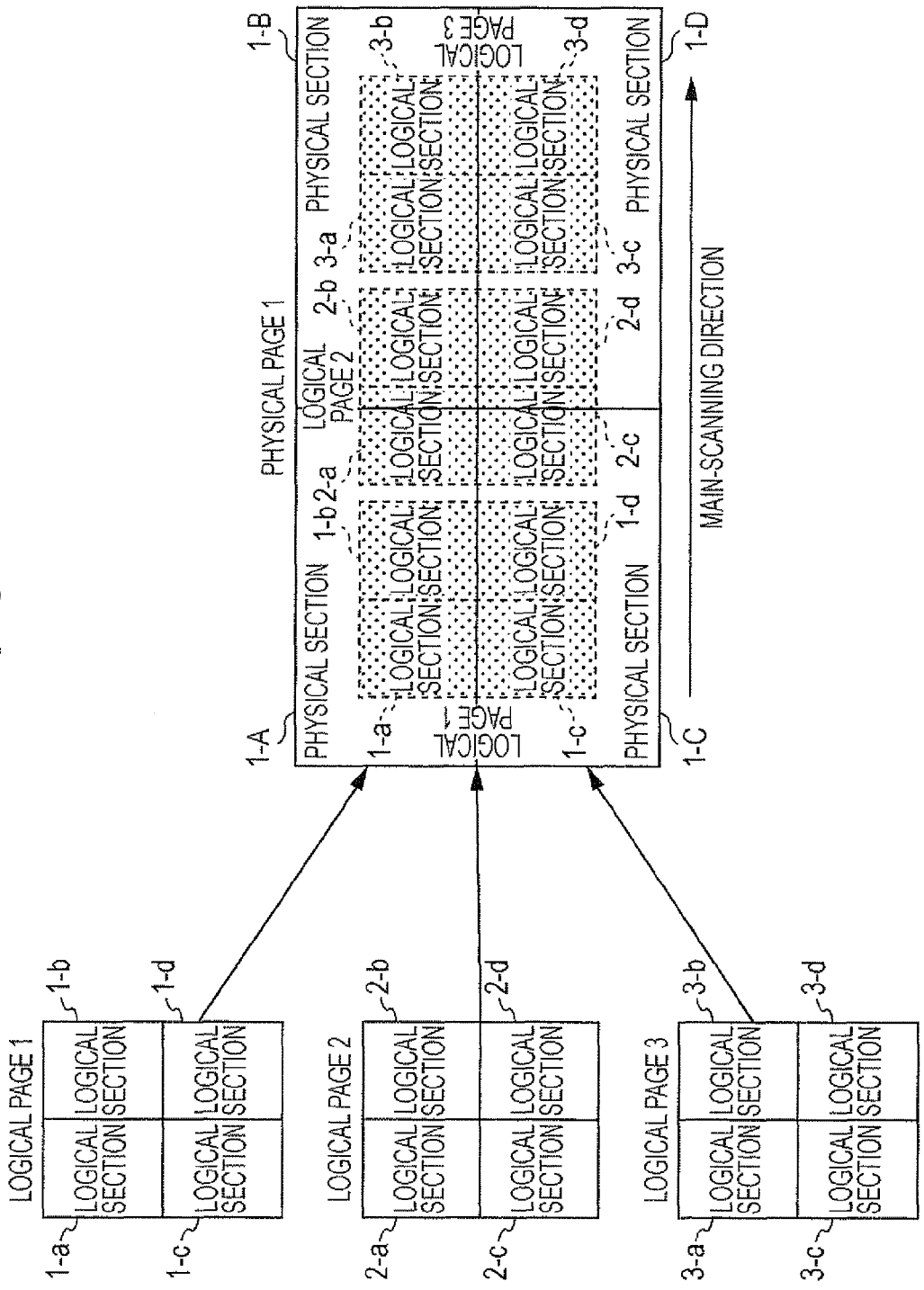
FIG. 9 is an illustration showing an example in which a boundary of logical sections does not correspond to a boundary of physical sections.

In the example in FIG. 6, a boundary of logical sections is aligned with a boundary of physical sections; however, the boundaries do not have to be aligned with each other. For example, in an example in FIG. 9, a boundary along a vertical direction of physical sections is not aligned with a boundary of logical sections. A logical section 2-a is arranged in physical sections 1-A and 1-B, and a logical section 2-c is arranged in physical sections 1-C and 1-D. Such misalignment occurs, for example, when the logical-section data generator 114 of the front-end device 110 divides a logical page into logical sections by a fixed dividing method independent from mapping (making correspondence) of logical sections with respect to physical sections. If a single logical section is arranged in plural physical sections, the logical-section data distributor 115 distributes intermediate data of the logical section arranged in the plural physical sections to all marking processors 122 corresponding to the plural physical sections. For example, in an example in FIG. 9, intermediate data of the logical section 2-a is distributed to both the marking processor 122A corresponding to the physical section 1-A and the marking processor 122B corresponding to the physical section 1-B. The marking processor 122A uses the received intermediate data of the logical section 2-a, and renders part of the logical section 2-a in the corresponding physical section 1-A. Similarly, the marking processor 122B renders part of the logical section 2-a in the corresponding physical section 1-B.

If the logical-section data generator 114 divides the logical section such that the boundary of the logical sections is aligned with the boundary of the physical sections, the logical-section data does not have to be distributed to the plural marking processors 122 in a redundant manner. For example, a device (for example, a printer driver of a client apparatus 200 that performs imposition setting) having information of arrangement positions of logical pages on a physical page and information of a dividing method of physical sections may determine a dividing method of logical sections such that a boundary of logical sections is aligned with a boundary of physical sections, and may send setting information indicative of the dividing method to the print system 100, for example, by adding the setting information to print data. The logical-section data generator 114 recognizes the individual logical sections based on the setting information. Also, the device generates mapping information indicative of a correspondence relationship between the logical sections and the physical sections together with the setting information indicative of the dividing method of the logical sections, and may provide the mapping information to the print system 100. The logical-section data distributor 115 receives the mapping information, and distributes the logical-section data based on this information.

In the above-described exemplary embodiment and modification, a concept of a "logical page" includes page information indicative of a register mark (also called registration mark) used for print management for a cutting position or alignment. The register mark includes, for example, an alignment mark which is a mark for cutting. FIG. 10 illustrates an example of page information indicative of register marks. In the example in FIG. 10, register marks 152 are arranged at four corners of a page 150. Print content is arranged within a rectangular region surrounded by the register marks (however, when printing is performed, a bleed is typically provided in a surrounding area of the print content to prevent a blank from remaining in a cutting area even if a mechanical positional error is generated, and the bleed may overlap the register marks. In the marking processing, a page image of the register marks is rendered, and a page image of the print content is rendered thereon. In the above-described exemplary embodiment and modification, as shown in FIG. 10, the page 150 with the register marks may be divided into plural logical sections like the page of the print content, and may be given to marking processors 122 respectively corresponding to the different physical sections for processing. FIG. 10 corresponds to the dividing method shown in FIG. 1. However, processing for rendering while a logical page of the register marks is superposed on a logical page of the print content does not have to use the dividing method. The processing may use other dividing method, for example, as shown in FIG. 6.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image data processing system, comprising:
a computer processor;
a plurality of first units, operable in parallel on the computer processor, comprising interpreters that are each configured to:
receive, from an assigning device, respective individually-assigned logical pages included in document data described in a page description language,
interpret data of the assigned logical pages included in document data described in a page description language that are individually assigned to each interpreter by an assigning device,
generate intermediate data of the logical pages, where each logical page comprise a plurality of logical sections,
divide the generated intermediate data of the logical pages into intermediate data on the basis of the logical sections of the logical pages, and
output the divided intermediate data,
wherein each of the plurality of first units operate in parallel so that at least one of the logical sections are processed by one of the first units while at least another of the logical sections are processed by another of the first units at the substantially same time; and
a plurality of second units, operable in parallel on the computer processor, wherein the plurality of second units are configured to correspond to a plurality of physical sections on a physical page, the plurality of second units comprising marking processors configured to:
generate print image data from the intermediate data of the plurality of logical sections included in corresponding physical sections from among the intermediate data of the logical sections on the logical pages generated by the plurality of first units, and
output the generated print image data to a printer,
wherein each of the plurality of second units operate in parallel so that at least one of the logical sections are processed by one of the second units while at least another of the logical sections are processed by another of the second units at the substantially same time,
wherein the plurality of first units are different from the plurality of second units, and
wherein the image data processing system controls supply of the print image data to the printer in a successive order of raster scanning so that the print image data is alternately transmitted and printed.

2. The image data processing system according to claim 1, further comprising a distributor that distributes the intermediate data input from the plurality of first units to the plurality of second units.

3. The image data processing system according to claim 1, wherein the number of the first units is equal to or larger than the number of logical pages written on a single physical page.

4. The image data processing system according to claim 1,
wherein the physical sections are bands obtained by dividing the physical page in a sub-scanning direction that is a moving direction of a sheet relative to the printer, and
wherein the image data processing system further comprises a supply controller that controls supply of print image data of the bands generated in parallel by the plurality of second units, to the printer in order of the bands on the physical page along the sub-scanning direction.

5. The image data processing system according to claim 1,
wherein the physical sections are tiles obtained by dividing the physical page in a sub-scanning direction that is a moving direction of a sheet relative to the printer, and in a main-scanning direction that is perpendicular to the sub-scanning direction, and
wherein the image data processing system further comprises a supply controller that controls supply of print image data of a plurality of tiles at equivalent positions in the sub-scanning direction from among print image data of the tiles generated in parallel by the plurality of second units, to the printer in order of raster scanning.

6. The image data processing system according to claim 1, wherein, if a single logical section is arranged in a plurality of physical sections, intermediate data of the logical section is supplied to the second units corresponding to that plurality of physical sections.

\* \* \* \* \*